(12) United States Patent
Xu et al.

(10) Patent No.: US 8,224,184 B2
(45) Date of Patent: Jul. 17, 2012

(54) METHOD AND ARCHITECTURE FOR PROVIDING HIGH BANDWIDTH BROADBAND COMMUNICATION TO FAST MOVING USERS

(75) Inventors: Jun Xu, Carlsbad, CA (US); Fei Huang, San Diego, CA (US); Kit S. Wong, San Diego, CA (US)

(73) Assignee: Motorola Mobility, Inc., Libertyville, IL (US)

( * ) Notice: Subject to any disclaimer, the term of this patent is extended or adjusted under 35 U.S.C. 154(b) by 959 days.

(21) Appl. No.: 12/240,264

(22) Filed: Sep. 29, 2008

(65) Prior Publication Data

US 2010/0080555 A1  Apr. 1, 2010

(51) Int. Cl.
- *H04B 10/00* (2006.01)
- *H04J 3/00* (2006.01)
- *H04W 4/00* (2009.01)

(52) U.S. Cl. ............ 398/115; 398/43; 398/70; 370/336; 370/334; 455/422.1; 455/561; 455/11.1

(58) Field of Classification Search .............. 398/43, 398/57, 70, 79, 96, 107; 370/328, 336, 334, 370/342, 344, 352, 400, 406; 455/11.1, 422.1, 455/436, 561, 62
See application file for complete search history.

(56) References Cited

U.S. PATENT DOCUMENTS

| | | | |
|---|---|---|---|
| 5,729,826 A | 3/1998 | Gavrilovich | |
| 6,785,558 B1 * | 8/2004 | Stratford et al. | 455/561 |
| 6,826,163 B2 | 11/2004 | Mani et al. | |
| 6,985,731 B1 | 1/2006 | Johnson et al. | |
| 7,031,711 B2 | 4/2006 | Soliman | |
| 7,127,175 B2 | 10/2006 | Mani et al. | |
| 7,127,176 B2 | 10/2006 | Sasaki | |
| 7,221,904 B1 * | 5/2007 | Gavrilovich | 455/11.1 |
| 7,242,935 B2 | 7/2007 | Odenwalder | |
| 7,847,701 B2 * | 12/2010 | Bajpay et al. | 340/652 |
| 2007/0025296 A1 | 2/2007 | Jung et al. | |
| 2008/0145056 A1 * | 6/2008 | Boldi et al. | 398/96 |

FOREIGN PATENT DOCUMENTS

WO  02093955 A1  11/2002

OTHER PUBLICATIONS

Gavrilovich, Charles D.: "Broadband Communication on the Highways of Tomorrow", IEEE Commun. Mag., vol. 39, No. 4, Apr. 2001, pp. 146-154.

Lannoo, Bart et al.: "Radio-over-Fiber-Based Solution to Provide Broadband Internet Access to Train Passengers", IEEE Commun. Mag., vol. 45, No. 2, Feb. 2007, pp. 56-62.

* cited by examiner

*Primary Examiner* — Loha Ben

(57) ABSTRACT

A wireless communication network architecture 100 is provided. The wireless communication network architecture consists of multiple fiber optic rings 110, 120, 130 and employs a Radio over Fiber (RoF) network. Each of these fiber optic rings is constructed using an optical fiber on a segment 105, 115, 125 formed by dividing a path. Each fiber optic ring includes a number of remote antenna units (RAUs) 181-184, 191-194. Each RAU 4 is integrated into a corresponding Add/Drop Multiplexer (ADM) 186-189, 196-199 and each ADM is further connected to a base station.

13 Claims, 13 Drawing Sheets

1200

```
┌─────────────────────────────────────┐ ⎤1210
│ RECEIVING A POSITION INFORMATION OF A│
│ PLURALITY OF RAUs BY A FAST MOVING USER│
└─────────────────────────────────────┘
                    │
                    ▼
┌─────────────────────────────────────┐ ⎤1220
│ DETERMINING A SET OF PARAMETERS OF THE│
│         FAST MOVING USER             │
└─────────────────────────────────────┘
                    │
                    ▼
┌─────────────────────────────────────┐ ⎤1230
│   COMPARING THE RECEIVED POSITION    │
│  INFORMATION AND THE DETERMINED SET OF│
│  PARAMETERS TO DETERMINE WHETHER A   │
│  HAND-OFF IS REQUIRED BY FAST MOVING USER│
└─────────────────────────────────────┘
```

*FIG. 12*

METHOD AND ARCHITECTURE FOR PROVIDING HIGH BANDWIDTH BROADBAND COMMUNICATION TO FAST MOVING USERS

FIELD OF THE DISCLOSURE

The present disclosure relates generally to wireless communication systems, and more particularly to a wireless communication network architecture that provides high-bandwidth broadband communication to fast moving users.

BACKGROUND

In a conventional wireless communication system, the service area is divided into hexagonal cells. A cell is the basic geographic unit of a cellular system and each cell contains a base station that transmits over a small geographic area. A typical wireless cellular system includes users (mobile units), base stations, and a mobile telecommunications switching office (MTSO). The mobile unit has radio transceiver equipment that communicates with similar equipment in the base station using antennas at both ends. Each base station relays telephone signals between mobile units and an MTSO. The base station not only transmits and receives the radio frequency signals to and from the mobile units, but also processes these signals. The MSTO is in turn connected through links to a public switched telephone network (PSTN). As a user moves from one cell to another, the mobile unit of the user is handed off from one base station to another base station.

Fast moving users (such as the users traveling by car on highways or traveling by train) demand high-bandwidth broadband communication. At typical train speed or even highway speed, the current wireless communication network architectures provide a much lower data rate than desired by the fast moving user. Therefore, the current wireless communication network architecture is unable to solve the problem of combining high-bandwidth broadband communication and fast moving users while keeping a reasonable quality of service.

Accordingly, there is a need for a method and architecture for providing high-bandwidth broadband communication to fast moving users.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 12 is a flowchart of a method of providing rapid hand-off to fast moving users in accordance with an embodiment of the present invention.

Figure 1:
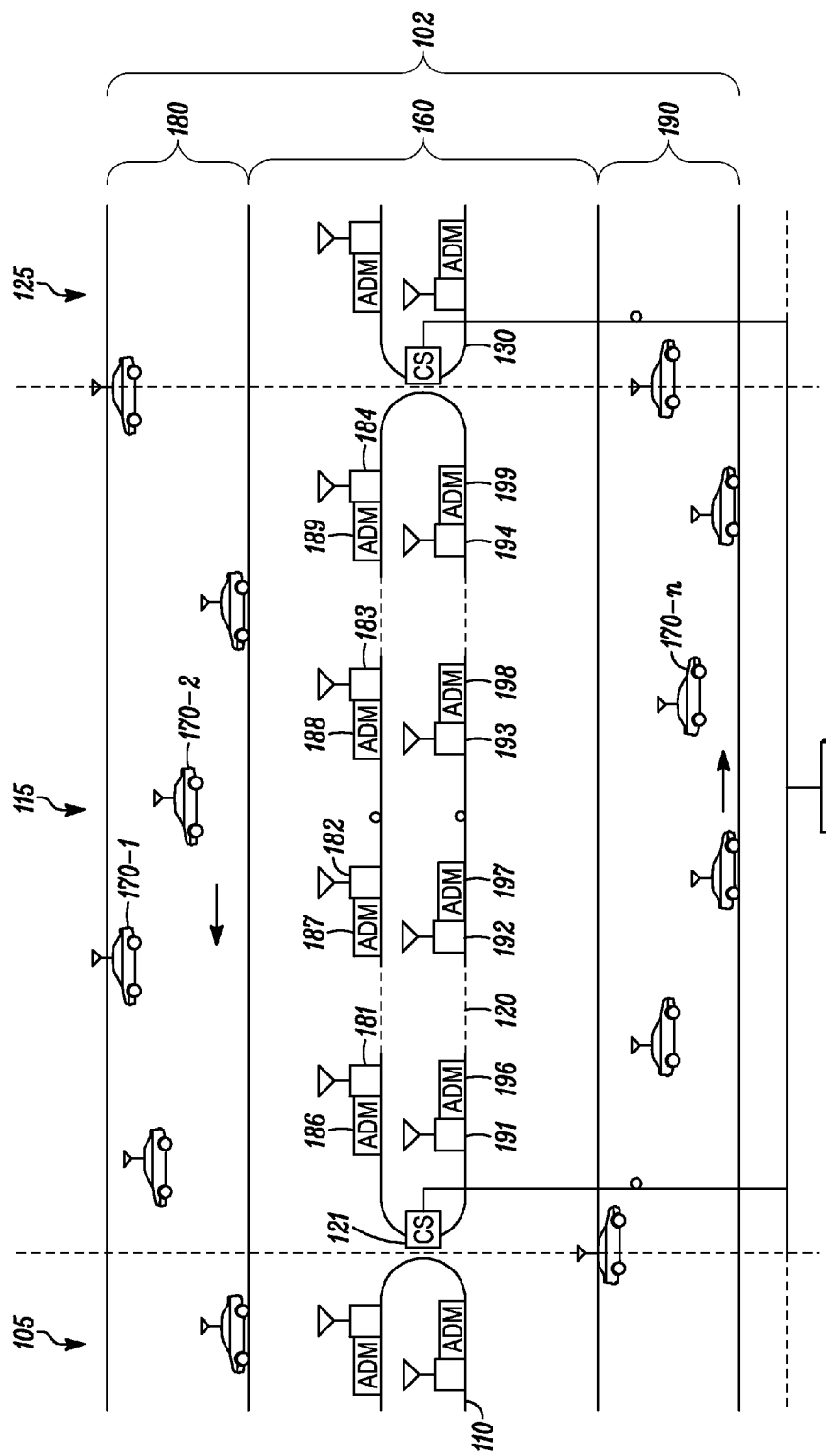
FIG. 1 is a block diagram of a wireless communication network architecture in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

To address the need for a method and architecture for providing high-bandwidth broadband communication to fast moving users, a wireless communication network architecture is provided that comprises a number of fiber optic rings and that employs a Radio over Fiber (RoF) network. A path of travel of a fast moving user is divided into multiple segments and, for each segment, a fiber optic ring is constructed using an optical fiber. Each fiber optic ring includes multiple remote antenna units (RAUs). Each RAU is integrated into an Add/Drop Multiplexer (ADM), and each ADM is further connected to a base station.

The present invention may be more fully described with reference to FIGS. 2-14. FIG. 1 is a block diagram of an architecture of a wireless communication network 100 in accordance with an embodiment of the present invention. Included in FIG. 1 is a depiction of a user path 102 of travel. For example and as depicted in FIG. 1, path 102 may be a highway that includes two roadways 180, 190, that is, a first roadway 180 for fast moving users (for example, vehicular traffic or users on a train) moving in a first direction and a second roadway 190 for users moving in the opposite direction. The two roadways are divided by a center divider 160. Path 102 is divided into multiple path segments 105, 115, and 125. Each segment 105, 115, 125 includes a respective fiber optic ring 110, 120, 130, that resides in center divider 160.

Each fiber optic ring 110, 120, 130 is constructed on one segment 105, 115, 125 of path 102 and includes multiple remote antenna units (RAUs) 181-184, 191-194 (eight shown). The RAUs 181-184, 191-194 are distributed around the ring; for example, a first set, for example, one-half of, the multiple RAUs, that is, RAUs 181-184, may be placed on a side of center divider 160 that is adjacent to, and provides service to the users of, roadway 180 and a second set of, for example, the other half of, the multiple RAUs, that is, RAUs 191-194, may be placed on the other side of center divider 160 that is adjacent to, and provides service to the users of, the other roadway 190. Each RAU 181-184, 191-194 includes an antenna and other functionality and is responsible for receiving and transmitting the wireless radio frequency signals, from and to the fast moving users 170-1, 170-2, . . . , 170-n traveling along the adjacent roadway. In the example of FIG. 1, the antenna of each RAU 181-184, 191-194 is outwardly radiating from center divider 160, that is, radiates towards the adjacent roadway and away from center divider 160.

Each RAU 181-184, 191-194 is integrated into an associated Add/Drop Multiplexer (ADM) 186-189, 196-199 (eight shown). In turn, each ADM 186-189, 196-199 is connected to a fiber optic ring, that is, in the case of ADMs 186-189, 196-199, to fiber optic ring 120 of segment 115. The ADM is responsible for add, drop, drop-continue, and pass-through of signals intended for, and received from, users traveling along path 102.

Network 100 also includes multiple base stations (not shown). Each base station is connected to a RAU and all base stations belonging to a particular fiber optic ring 120 are located in a common location to form a control station 121. Each control station 121 is also integrated into an ADM (not shown) and these ADMs, in turn, are connected to a mobile telephone switching office (MTSO) 104.

In one example, the fiber optic rings 110, 120, 130 are equal-distantly positioned along the path 102 and the RAUs in each fiber optic ring, such as RAUs 181-184 and 191-194 in fiber optic ring 120, are also equal-distantly distributed on the fiber optic ring. In another example, the fiber optic rings 110, 120, 130 may not be equal-distantly positioned along the path and the RAUs 181-184 and 191-194 in the fiber optic ring 120 may or may not be equal-distantly distributed on the fiber optic ring.

Each fiber optic ring 110, 120, 130 may be implemented using various techniques. In one example, a SONET/SDH ring structure may be used. Among other things, a SONET/SDH ring architecture provides signal aggregation of digitized radio frequency signals. To further increase network capacity, wavelength division multiplexing (WDM) technique in combination with time division multiplexing (TDM) techniques (such as SONET/SDH) can be employed.

Figure 2:
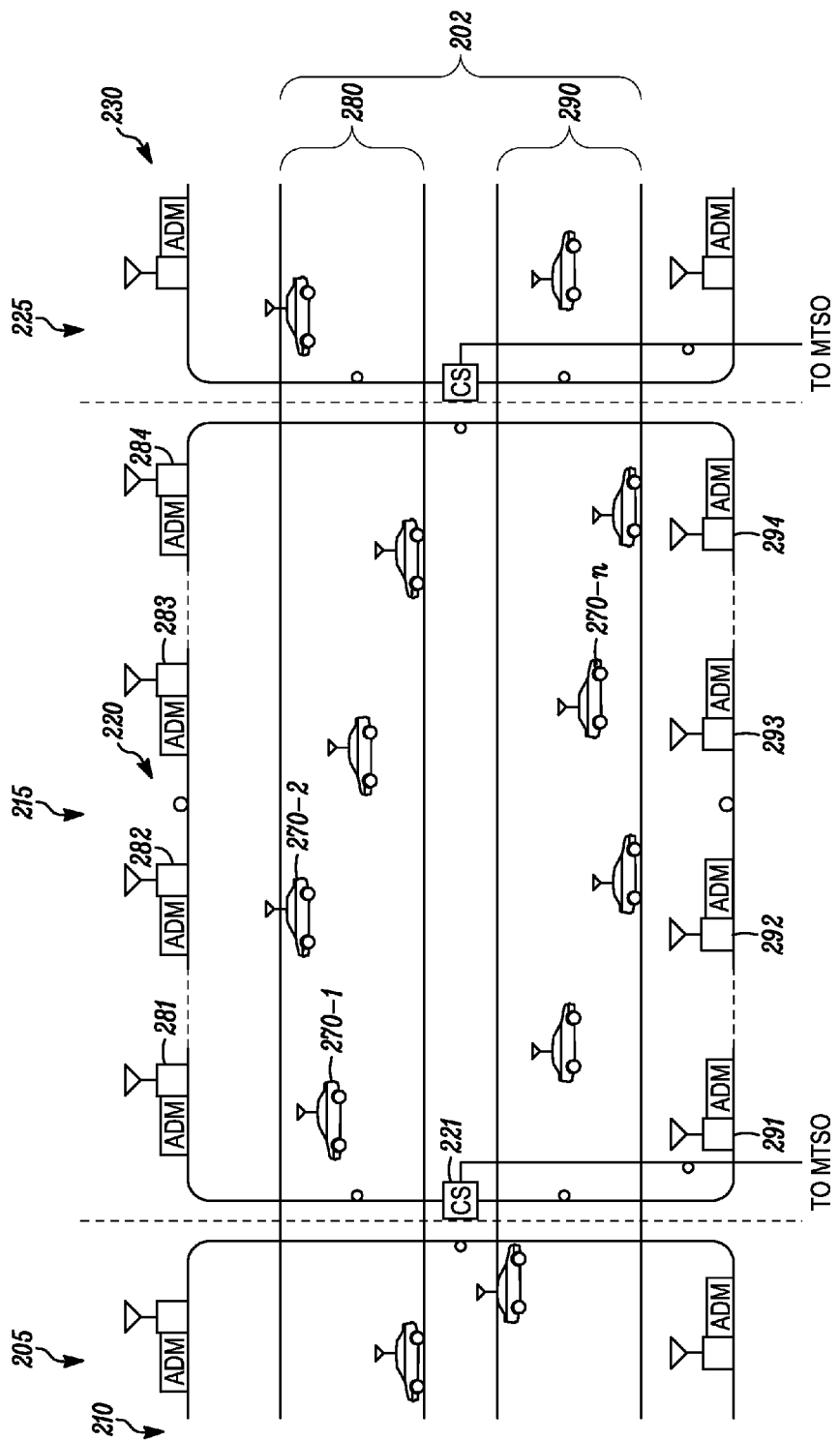
FIG. 2 is a block diagram of another wireless communication network architecture in accordance with an embodiment of the present invention.

FIG. 2 is a block diagram of an architecture of a wireless communication network 200 in accordance with another embodiment of the present invention. Similar to FIG. 1, a user path 202 in FIG. 2 comprises a multi-directional highway that includes two roadways 280, 290, wherein each roadway services users headed in a direction opposite of the users in the other roadway. Also similar to FIG. 1, path 202 is divided into multiple path segments 205, 215, 225 and is traversed by multiple users 270-1, 270-2, . . . , 270-n. Each path segment 205, 215, 225 includes a respective fiber optic ring 210, 220, 230 that, in turn, includes multiple RAUs, for example, 281-284, 291-294 (eight shown) with respect to fiber optic ring 220. However, unlike network 100, in network 200 the RAUs 281-284, 291-294 reside outside of the roadways instead of in a center divider between the two roadways 280, 290. For example, a first set of, for example, one-half of, the multiple RAUs, that is, RAUs 281-284, are placed on the right hand side of left-bound roadway 280 and are dedicated to the users on roadway 280 and a second set of, for example, the other half of, the multiple RAUs, that is, RAUs 291-294, are placed on the right hand side of right-bound roadway 290 and are dedicated to the traffic on roadway 290. In the example of FIG. 2, the antenna of every RAU 281-284, 291-294 is inwardly radiating along path 202, that is, is directed toward the RAU's associated roadway. The functionality of all other elements is similar to FIG. 1.

Figure 3:
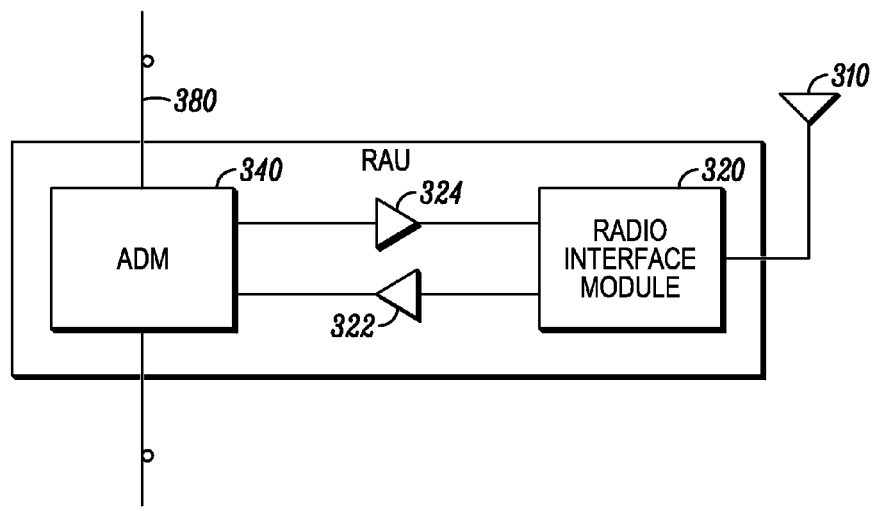
FIG. 3 is a block diagram of a remote antenna unit in accordance with an embodiment of the present invention.

FIG. 3 is a block diagram of a remote antenna unit 300, such as RAUs 181-184, 191-194, 281-284, and 291-294, in accordance with an embodiment of the present invention. The RAU 300 includes an antenna 310, a radio interface module 320, an uplink radio signal amplifier 322, a downlink radio signal amplifier 324, an ADM 340, and an optical fiber 380. In the embodiment depicted in FIG. 3, the signals exchanged over the optical fiber 380 are analog.

The antenna 310 receives uplink signals and transmits downlink signals. Additionally, the antenna 310 should provide a highly directive radiation pattern required by the aforementioned network architectures of FIG. 1 and FIG. 2. In an uplink direction, the radio interface module 320 provides an interface between radio frequency signals received at the antenna 310 and the uplink radio frequency signal amplifier 322. In a downlink direction, the radio interface module 320 provides an interface between the downlink radio amplifier 324 and radio frequency signals transmitted to a fast moving user using the antenna 310. The uplink radio frequency signal amplifier 322 and the downlink radio frequency signal amplifier 324 each are coupled to the ADM 340. The ADM 340 is responsible for add, drop, drop-continue, and pass-through of the signals. In addition, ADM 340 also acts as an optical-to-electrical (O/E) converter and an electrical-to-optical (E/O) converter. The ADM 340 interfaces with the optical fiber 380 and allows radio frequency signals received from the uplink radio amplifier 322 to be added to the pass-through traffic on the optical fiber 380. The ADM 340 also drops the radio frequency signals from the traffic on the optical fiber 380 and sends the dropped radio frequency signals to the downlink radio amplifier 324 for amplification.

Figure 4:
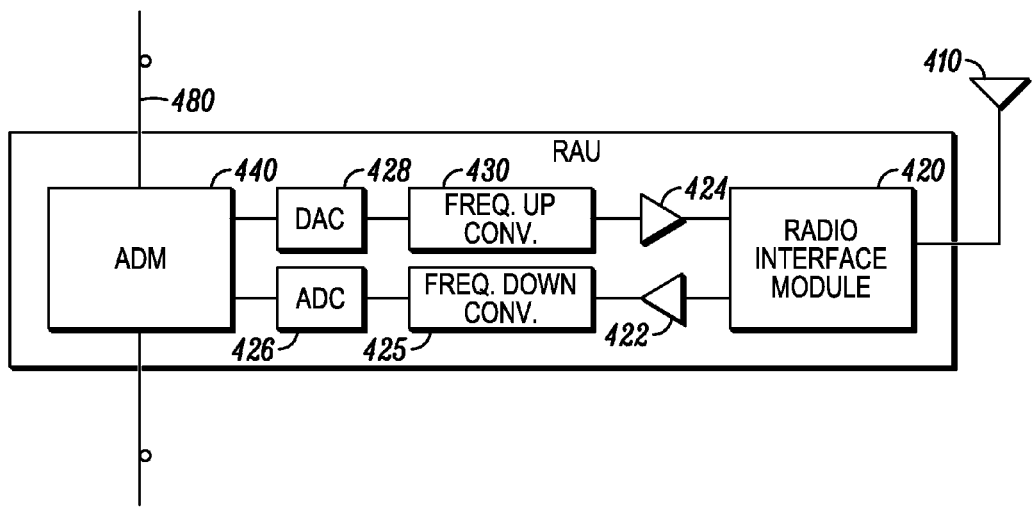
FIG. 4 is a block diagram of a remote antenna unit in accordance with another embodiment of the present invention.

FIG. 4 is a block diagram of a remote antenna unit 400, such as RAUs 181-184, 191-194, 281-284, and 291-294, in accordance with another embodiment of the present invention. The RAU 400 includes an antenna 410, a radio interface module 420, an uplink radio signal amplifier 422, a downlink radio signal amplifier 424, a frequency down-converter 425 a frequency up-converter 430, an analog to digital converter (ADC) 426, a digital to analog converter (DAC) 428, an ADM 440, and an optical fiber 480. In the embodiment depicted in FIG. 4, the signals exchanged over the optical fiber 480 are digital.

Similar to RAU 300, the antenna 410 of RAU 400 receives uplink signals and transmits downlink signals. In the uplink direction, the radio interface 420 provides an interface between the analog radio frequency signals received at the antenna 410 and the uplink radio frequency signal amplifier 422. The uplink radio frequency signal amplifier 422 amplifies the radio frequency (RF) signals and transmits them to the frequency down-converter 425. The frequency down-converter 425 downconverts the RF signals to intermediate frequency (IF) signals and routes the IF signals to the ADC 426. The ADC converts the analog IF signals into digital signals and routes the digital signals to the ADM 440 to transmit using the optical fiber 480.

In the downlink direction, the DAC 428 converts the digital signals received from the optical fiber 480, via the ADM 440, into analog IF signals. These analog signals are routed to the frequency up-converter 430. The frequency up-converter 430 upconverts the frequency of the analog IF signals to a radio frequency (RF) and sends the RF signal to the downlink radio amplifier 424. The downlink radio amplifier 424 amplifies the RF signals and routes the RF signal to the antenna 410 via the radio interface module 420, where the downlink RF signals are transmitted to the fast moving users.

Similar to RAU 300, the ADM 440 of RAU 400 is responsible for add, drop, drop-continue, and pass-through of the signals. In addition, ADM 440 also acts as an optical-to-electrical (O/E) converter and an electrical-to-optical (E/O) converter. The ADM 440 interfaces with the optical fiber 480 and allows the digital radio frequency signals received from the uplink radio amplifier 422 to be added to the pass-through traffic on the optical fiber and digital radio frequency signals to be dropped from the traffic on the optical fiber 380 and sent to the downlink radio amplifier 424 for amplification.

Figure 5:
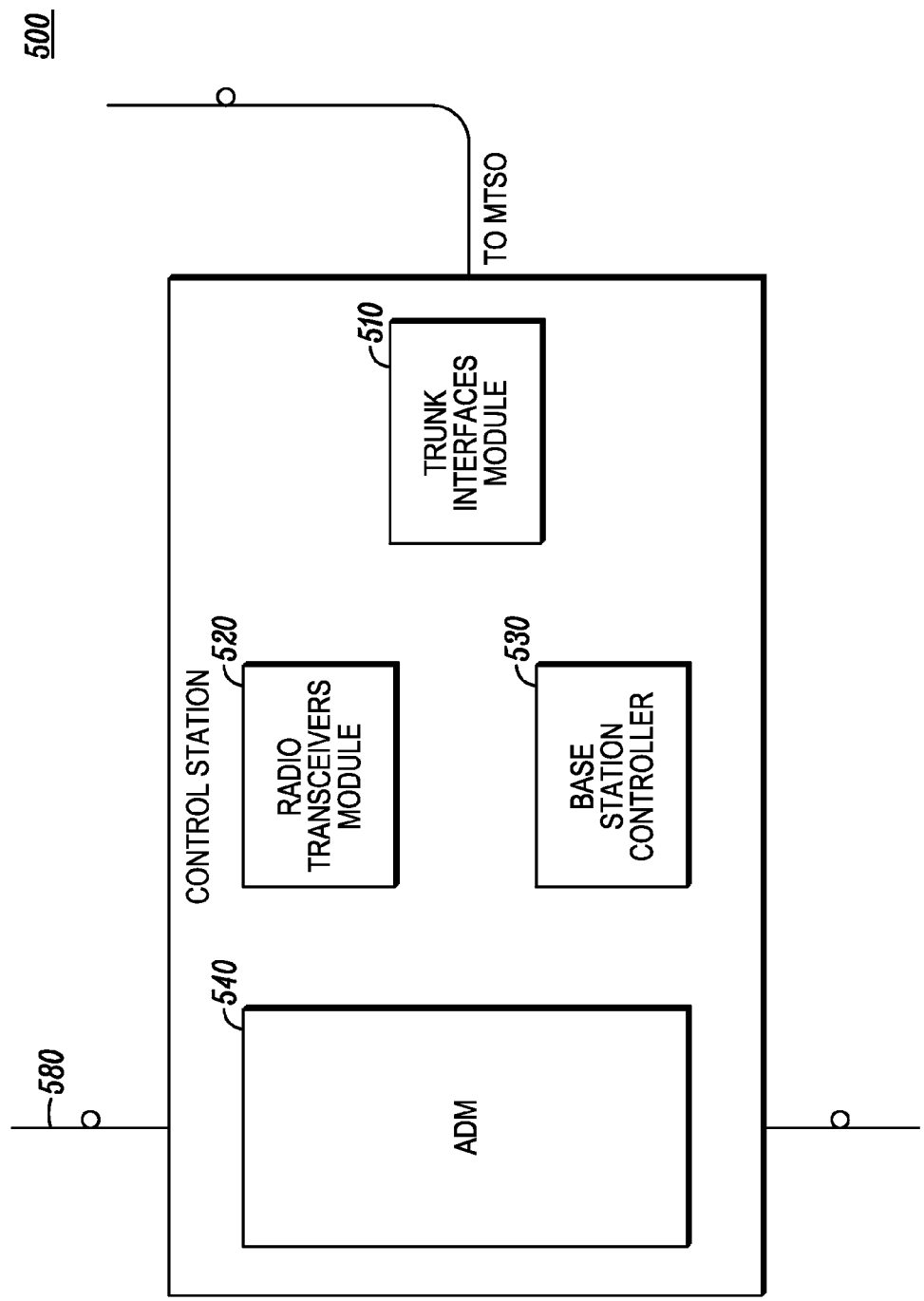
FIG. 5 is a block diagram of a control station in accordance with an embodiment of the present invention.

FIG. 5 is a block diagram of control station 500, such as control station 121, in accordance with an embodiment of the present invention. In this configuration, the control station 121 includes an ADM 540, a radio transceivers module 520, a base station controller 530, and a trunk interface module 510. The control station 500 is also connected to MTSO 104.

The ADM 540 interfaces with an optical fiber 580 and comprises of an optical-to-electrical converter for the uplink signals and an electric-to-optical converter for the downlink signals. In an uplink direction, the ADM 540 converts the incoming optical signals received from the optical fiber 580 into electrical signals and feed the electrical signals to the radio transceivers module 520. In a downlink direction, the ADM 540 converts the radio frequency signals received from the radio transceivers module 520 into optical signals and transmits the optical signals to the optical fiber 580.

To a large extent, the control station 500 is equivalent to a conventional base station without antenna. Collectively, the radio transceivers 520 module, the base station controller 530, and the trunk interface module 510 provide virtually identical functions to those of a conventional base station. These functions include providing RF transmission and reception, providing data communications with the MTSO 104 and mobile units, measuring a signal strength of a mobile unit, performing equipment control and reconfiguration functions, performing voice and data processing functions, performing call setup, call supervision, and call termination functions, and handling hand-off.

Thus, the control station 500 performs all the functions of a conventional base station except that the wireless RF signals transmitted by a control station are not immediately broadcast to the mobile units. Instead, the RF signals are transmitted by the control station, via an optical fiber 580, to a RAU, such as one of RAUs 181-184, 191-194, 281-284, and 291-294, and the RAU then wirelessly transmits the RF signals to the mobile units.

Figure 6:
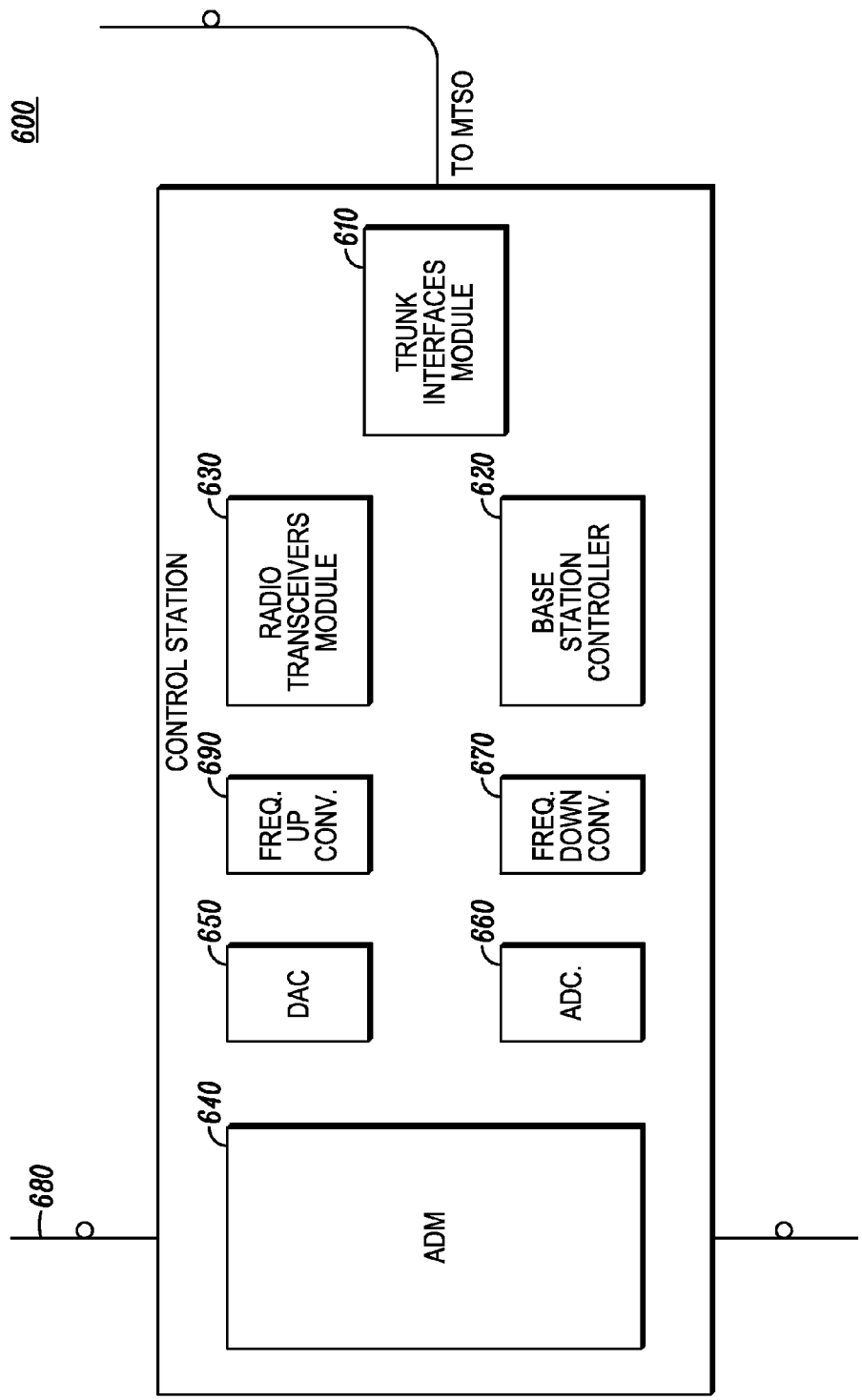
FIG. 6 is a block diagram of a control station in accordance with another embodiment of the present invention.

FIG. 6 is a block diagram of a control station 600, such as control station 121, in accordance with another embodiment of the present invention. The control station 600 is a variant of the control station 500 and is used when the optical fiber 680 carries digital signals. The control station 600 includes a digital to analog converter (DAC) 650 and a frequency up converter 690, an analog to digital converter (ADC) 660 and a frequency down converter 670, in addition to the elements depicted in the control station 500 (such as an ADM 640, a radio transceivers module 620, a base station controller 630, and a trunk interface module 610—the functionality of these elements is similar to the functionality of the corresponding elements of control station 500).

In the uplink direction, the control station 600 includes the digital to analog converter (DAC) 650 and the frequency up converter 690. After the ADM 640 converts the incoming digital optical signals received from the optical fiber 680 into digital electrical signals, the digital to analog converter 650 converts the digital electrical signals into analog IF signals and routes the analog IF signals to the frequency up converter 690. The frequency up converter 690 upconverts the frequency of the analog IF signals to a radio frequency (RF) and routes the analog radio signals to the radio transceivers module 620.

In the downlink direction, the control station 600 includes the ADC 660 and the frequency down converter 670. In the downlink direction, the frequency down-converter 670 down-converts the frequency of the analog radio signals received from the radio transceivers module 620 to IF signals and routes the IF signals to the ADC 660. The ADC 660 converts the analog IF signals into digital signals and routes the digital signals to ADM 640. The ADM 640 then converts the digital radio signals into optical signals and transmits the optical signals through the optical fiber 680.

Figure 7:
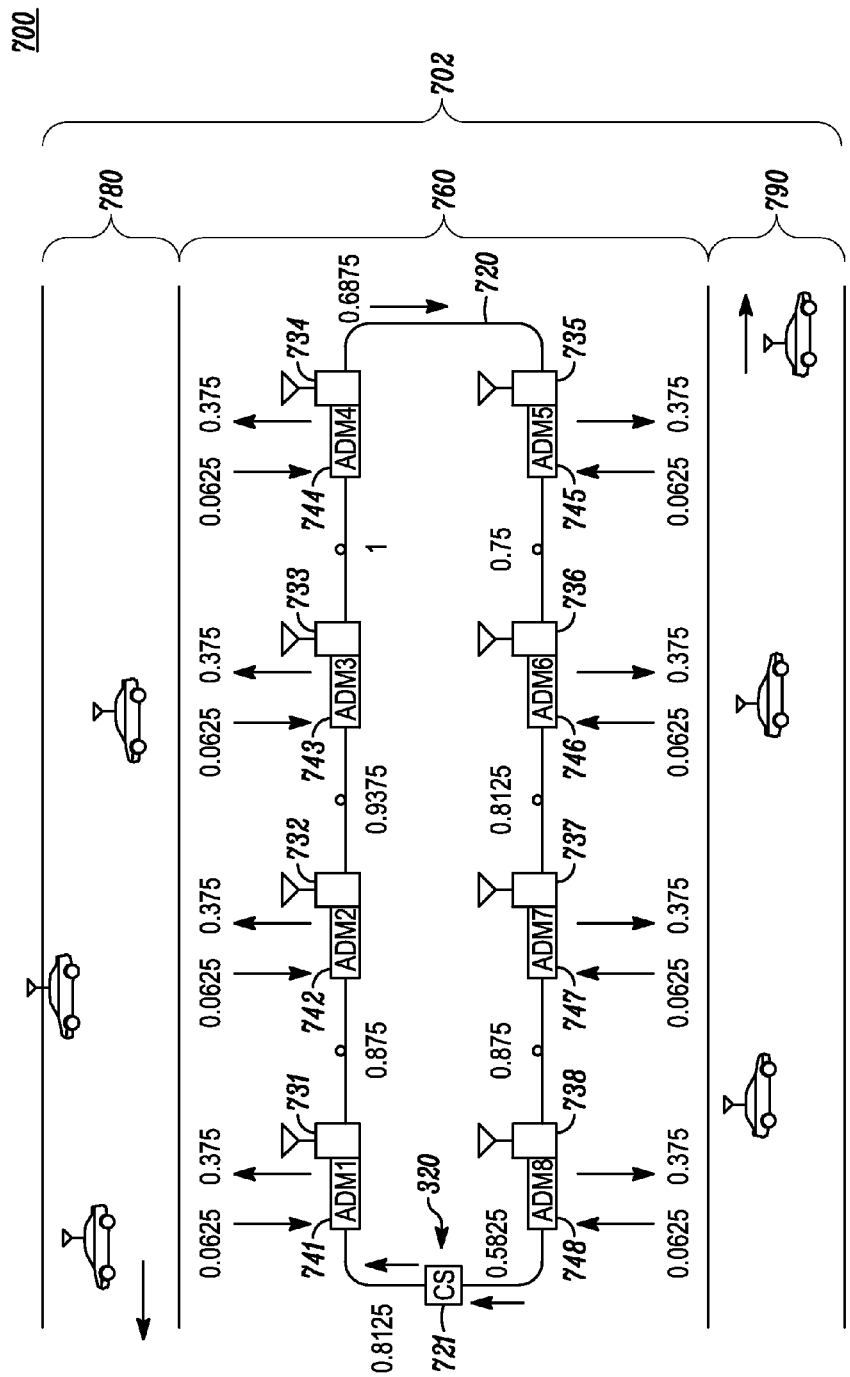
FIG. 7 is a block diagram illustrating a bandwidth allocation scheme in accordance with an embodiment of the present invention.

FIG. 7 is a block diagram of bandwidth allocation scheme implemented by a fiber optic ring 720 with eight RAUs 731-738, one control station 721, and traffic flowing in a clockwise direction along a path 702 in accordance with an embodiment of the present invention. Each RAU 731-38 is integrated into a respective ADM 741-748. As depicted in FIG. 7, a first set of the RAUs 731-738, that is, RAUs 731-734, are placed on one side of a center divider 760 of the path 702 and are dedicated to the traffic on a first roadway 780 of the path. A second set of the RAUs 731-738, that is, RAUs 735-738, are placed on the other side of the center divider 760 of the path 702 and are dedicated to the traffic on a second roadway 790 of path 702 that is headed in an opposite direction of roadway 780, similar to FIG. 1.

It should be noted that the downlink traffic on the first roadway 780 will not be entirely dropped until the downlink traffic arrives at the last ADM 744 on that side of the path. Similarly, downlink traffic on the roadway 790 will not be entirely dropped until it arrives at the last ADM 748 on that side of the path. These two "last" ADMs 744, 748 perform only "drop" functions for the downlink traffic. All other ADMs 741, 742, 743, 745, 746, 747 perform "drop and continue" (also known as "drop and repeat") functions as far as the downlink traffic is concerned. With drop and continue, a signal terminates at one node, is duplicated, and is then sent to the next and subsequent nodes.

In the embodiment depicted in FIG. 7, the total bandwidth, or data rate, provided by the fiber optic ring 720 is 2.5 gigabits per second (Gb/s), which bandwidth is allocated among the RAUs 731-738. More particularly, assuming the total bandwidth of the fiber optic ring 720 is one (1) unit, then, in the downlink direction, the control station 721 distributes 0.375 unit downlink bandwidth resources to the traffic on the first roadway 780 and 0.375 unit downlink bandwidth resources to the traffic on the other roadway 790, while in the uplink direction each of the ADMs 741, 742, 743, 744, 745, 746, 747, 748 add 0.0625 unit towards a total of 0.5 unit uplink bandwidth resources. In the above example, a bandwidth capacity of 0.0625 unit is reserved for network control and signaling purposes.

Figure 8:
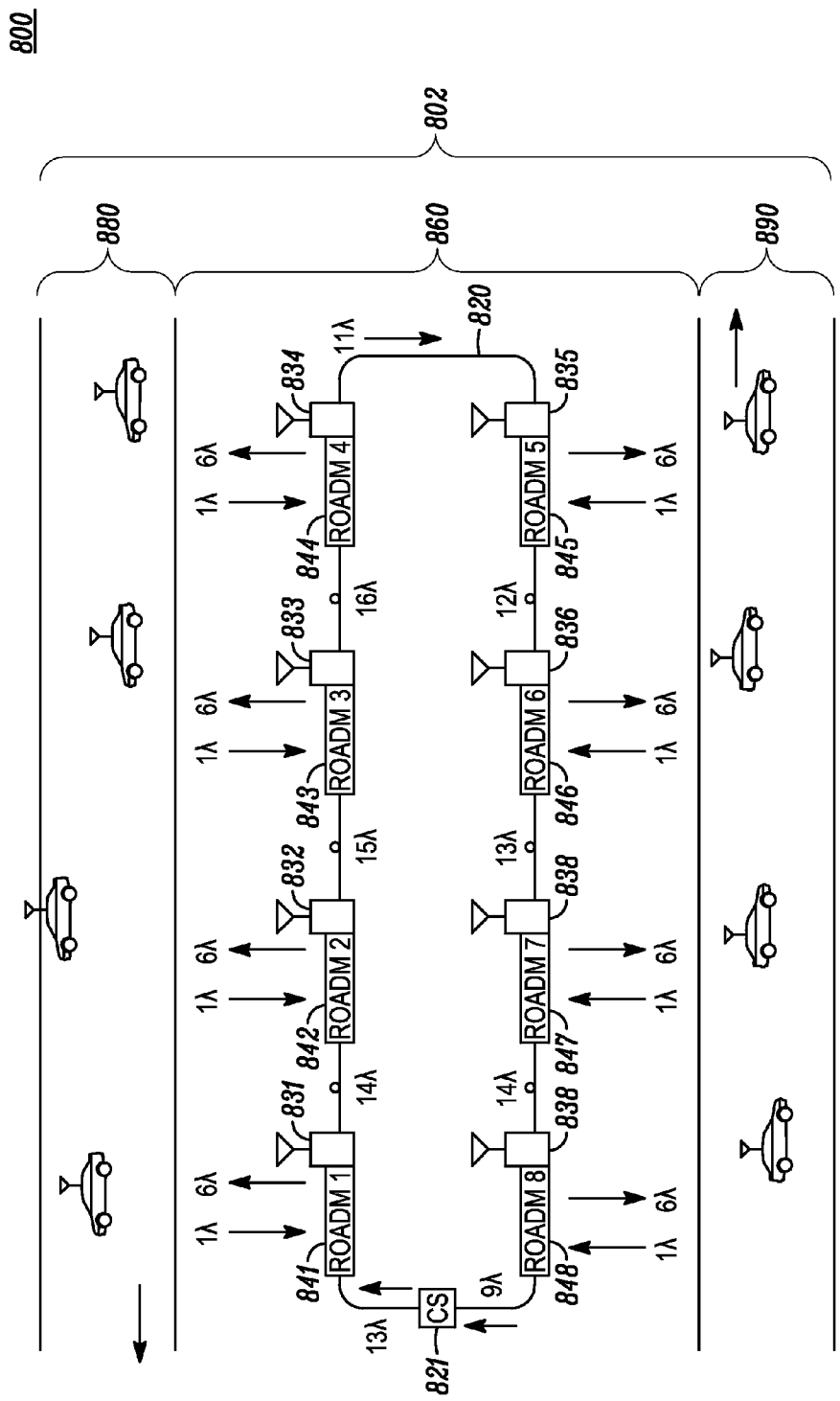
FIG. 8 is a block diagram illustrating a bandwidth allocation scheme in accordance with another embodiment of the present invention.

FIG. 8 is a block diagram of a bandwidth allocation scheme implemented by a fiber optic ring 820 employing a Dense Wave Division Multiplexing (DWDM) optical transport in accordance with another embodiment of the present invention. In the embodiment depicted in FIG. 8, the DWDM fiber optic ring 820 includes eight RAUs 831-838 that are each integrated into a respective Reconfigurable Optical Add/Drop Multiplexer (ROADM) 841-848, one control station 821, and traffic flowing in a counter-clockwise direction along a path 802.

ROADMs are used in DWDM fiber optic rings. ROADMs enable flexible transport network designs by allowing add and drop of any number of channels at any ROADM node. As demand in the network changes, additional channels can be dropped or inserted by using ROADM, thus creating a flexible provisioning system. ROADMs also automatically adjust the power in a wireless communication network as channels are dropped or inserted at a ROADM. ROADMs may also provide the ability to switch wavelengths from one path to another.

Similar to FIG. 7, a first set of the RAUs 831-838, that is RAUs 831-834, are dedicated to the traffic on a first roadway 880 of the path 802 and a second set of the RAUs 831-838, that is, RAUs 835-838, are dedicated to the traffic on a second roadway 890 of path 802, which roadway is directed in the opposite direction of roadway 880. The downlink traffic on the first roadway 880 will not be entirely dropped until it arrives at a last ROADM 844 on that side of the path and downlink traffic on the roadway 890 will not be entirely dropped until it arrives at a last ROADM 848 on that side of the path. These two, "last" ROADMs 844, 848 perform only "drop" functions for the downlink traffic. All other ROADMs 841, 842, 843, 845, 846, 847 perform "drop and continue" functions as far as the downlink traffic is concerned.

In the embodiment depicted in FIG. 8, the total number of wavelengths provided by the fiber optic ring 820 is 16 wavelengths ($\lambda$). In the downlink direction, the control station 821 distributes 6$\lambda$ worth of downlink bandwidth resources to the traffic on the first roadway 880 and 6$\lambda$ worth of downlink bandwidth resources to the traffic on the other roadway 890. In an uplink direction each of the ROADMs 841-848 add 1$\lambda$ towards a total of 8$\lambda$ worth of uplink bandwidth resources. A bandwidth capacity of 1$\lambda$ then is reserved for network control and signaling purposes. If the data rate for each wavelength is 2.5 Gb/s, the total bandwidth provided by the embodiment depicted in FIG. 8 is 16 times that of the embodiment depicted in FIG. 7, which is 40 Gb/s; however, there is an associated increase in terms of system cost.

By taking advantage of the fact that the RAUs are separated from the control station where all radio resources are located, network capacity and bandwidth resources can be dynamically allocated in the event that one part of the network (such as, one roadway 880) requires more resources than the other (such as, the other roadway 890), such as in a rush hour scenario when traffic is considerably heavier in one direction, that is on one roadway, than in the other direction/roadway.

For example, assuming in the morning that the traffic on the first roadway 880 is heavier than the traffic on the other roadway 890, a bandwidth reallocation may be performed such that the network bandwidth for the traffic on the first roadway 880 is three times as much compared to that for the traffic on the other roadway 890. In such a scenario and with reference to FIG. 8, in the downlink direction the control station 821 may distribute 9$\lambda$ worth of downlink bandwidth capacity to the traffic on the first roadway 880 and 3$\lambda$ worth of downlink bandwidth capacity to the traffic on the second roadway 890. While in the uplink direction, each of the ROADMs 841-848 add 1$\lambda$ towards a total of 8$\lambda$ worth of uplink bandwidth capacity.

Similarly, assuming in the afternoon that the traffic pattern reverses itself, more bandwidth resources may be allocated to the traffic on the second roadway 890 as compared to the bandwidth resources allocated to the first roadway 880. With reference to FIG. 8, in such a scenario, in the downlink direction the control station 821 may distribute 3$\lambda$ worth of downlink bandwidth resources to the traffic on the first roadway 880 and 9$\lambda$ worth of downlink bandwidth resources to the traffic on the second roadway 890. While in the uplink direction each of the ROADMs 841-848 adds 1$\lambda$ towards a total of 8$\lambda$ worth of uplink bandwidth resources. The method for dynamically reconfiguring bandwidth resources, as explained above, is described with reference to FIG. 9.

Figure 9:
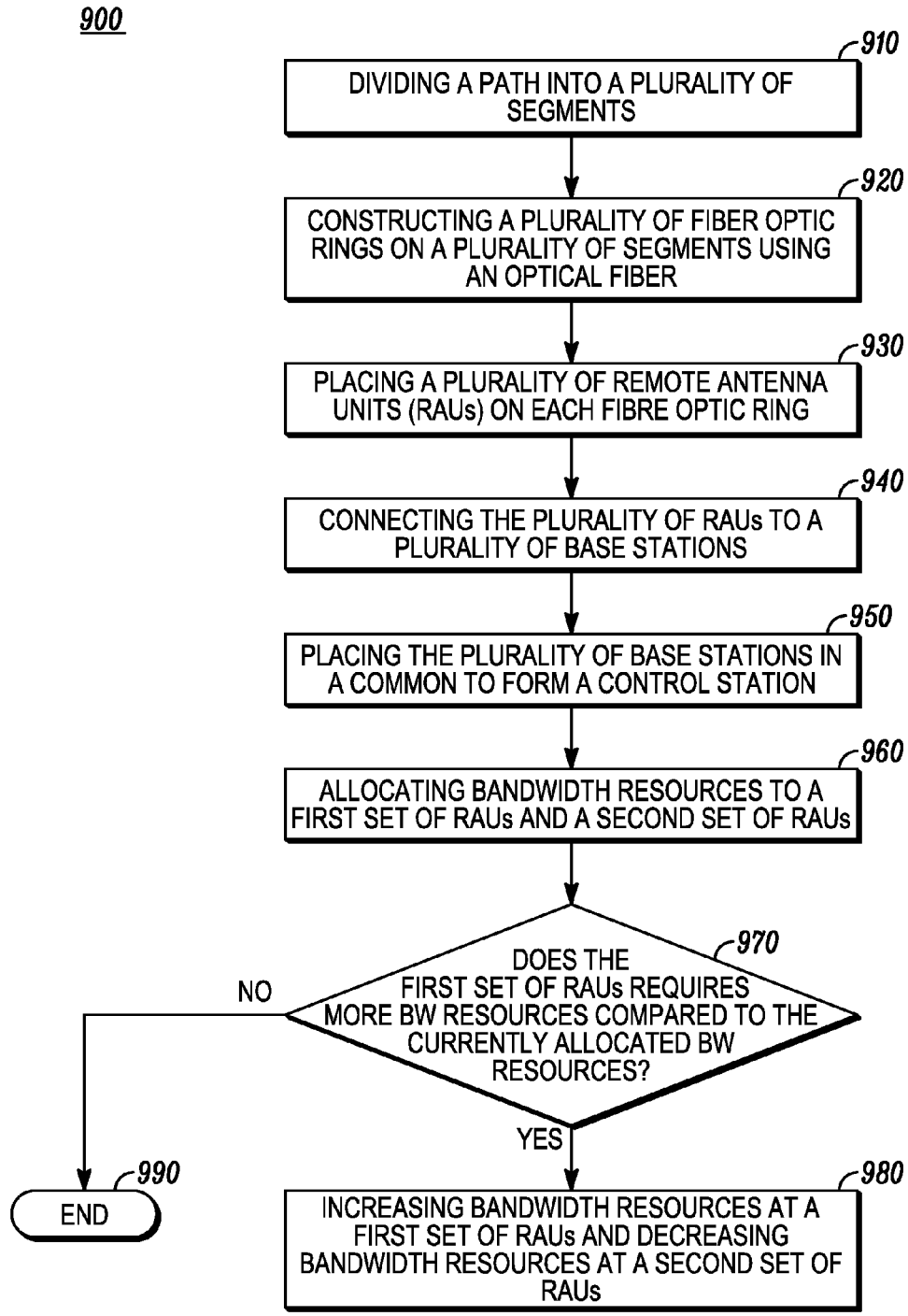
FIG. 9 is a flowchart of a method of dynamically reconfiguring bandwidth resources in accordance with an embodiment of the present invention.

FIG. 9 is a flowchart 900 of a method of dynamically reconfiguring bandwidth resources along a fiber optic ring in accordance with an embodiment of the present invention. The flowchart 900 begins when a path is divided 910 into multiple segments and a fiber optic ring is constructed 920 on each segment of the multiple segments.

For each fiber optic ring, multiple RAUs are coupled 930 to the fiber optic ring. A first set of the multiple RAUs, for example, one-half of the multiple RAUs, are placed on one side of a center divide of the path and are dedicated to the traffic on a first roadway of the path and a second set of the multiple RAUs, for example, the other half of the multiple RAUs, are placed on the other side of the center divide of the path and are dedicated to the traffic on a second roadway of the path, which second roadway is headed in an opposite direction of the first roadway.

The distance between each RAU of the multiple RAUs may be based on a frequency band, a wireless communication system capacity, a channel bandwidth, and an RAU power. Each RAU is integrated into an ADM. In one example, the ADM may be a ROADM.

Each RAU of the multiple RAUs is further connected 940 to a plurality of base stations. The plurality of base stations are placed 950 in a common location to form a control station. The control station is further connected to an MTSO. The RAUs, ADMs, fiber optic ring, base stations/control station, and MTSO form a Radio over Fiber (RoF) network. In one example, the RoF network employs a DWDM optical transport.

The control station allocates 960 a certain amount of bandwidth resources to the first set of RAUs, that is, the RAUs on one side of the center divide. The control station further allocates 960 a certain amount of bandwidth resources to the second set of RAUs, that is, the RAUs on the other side of the center divide.

The control station can dynamically allocate 970 bandwidth resources in the event that one part of the network (such as roadway 880 of FIG. 8) requires more resources than the other (such as roadway 890), for example, in the rush hour scenario when traffic in moving more heavily in one direction than the other. In other words, if more bandwidth resources are required at the first set of RAUs as compared to the currently allocated bandwidth resources and less bandwidth resources are required at the second set of RAUs as compared to the currently allocated bandwidth resources, the control station increases 980 the bandwidth resources at the first set of RAUs and decreases 980 the bandwidth resources at the second set of RAUs. Otherwise, the control station does not 990 dynamically re-allocate bandwidth resources.

In one example, the MTSO informs the control station to increase or decrease the bandwidth resources on one side of the fiber optic ring, based on the historic data about the traffic average on that path. In another example, the dynamic re-allocation of bandwidth resources may be based upon current determinations of traffic conditions on the path. This allows for dynamic allocation of bandwidth resources as and when needed and the total bandwidth resources of the fiber optic ring remains constant.

Figure 10:
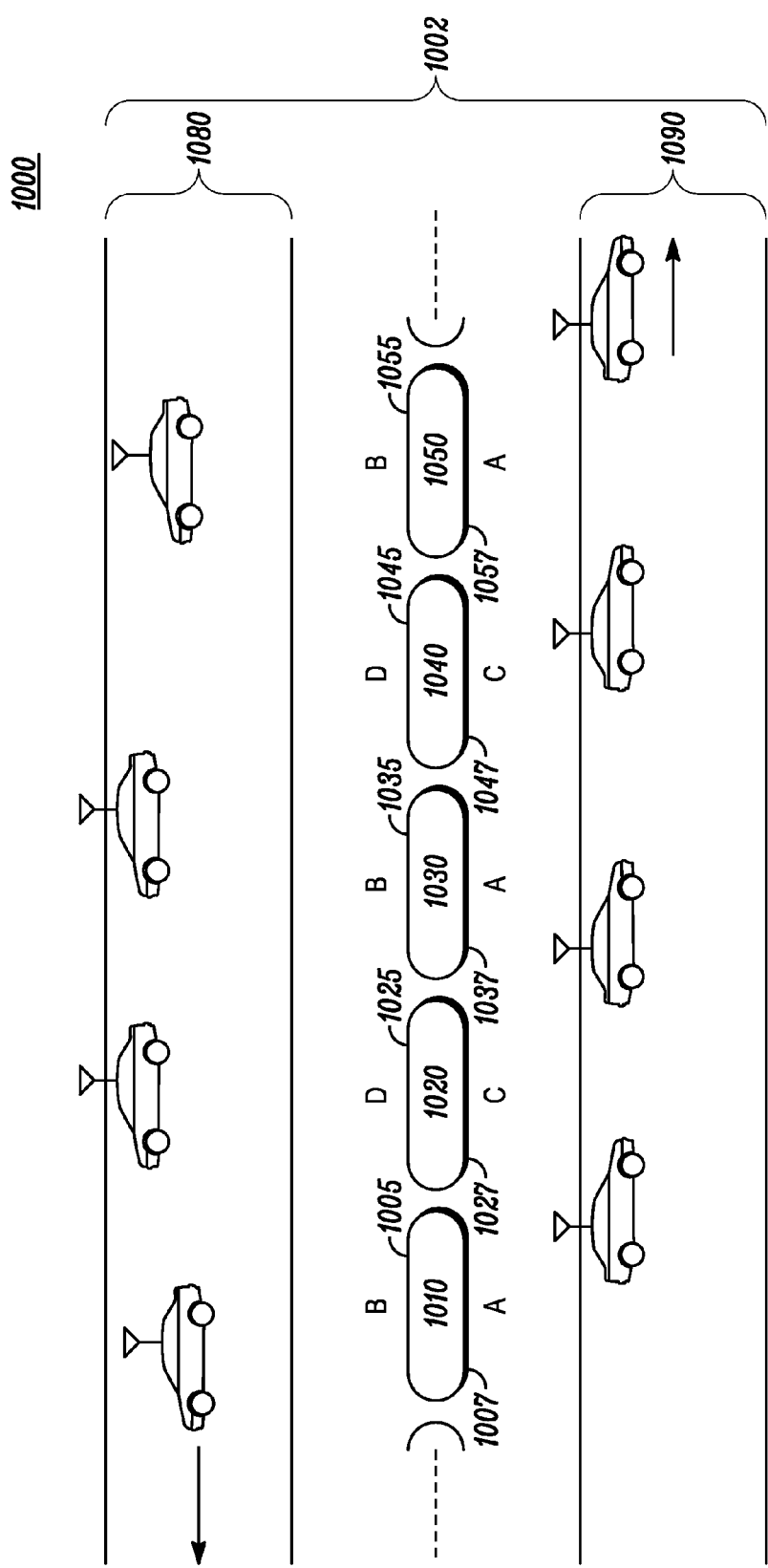
FIG. 10 is a graphical representation of a frequency reuse pattern in accordance with an embodiment of the present invention.

Referring now to FIG. 10, a block diagram is provided that depicts a frequency reuse pattern for a RoF network 1000 in accordance with an embodiment of the present invention. FIG. 10 includes a path 1002 that includes two roadways 1080 and 1090 for vehicular traffic moving in two opposite directions. The path is divided into multiple segments, and a fiber optic ring 1010, 1020, 1030, 1040, 1050 is constructed along a center divider on each segment of the path. Each fiber optic ring 1010, 1020, 1030, 1040, 1050 includes a multiple RAUs 1005, 1007, 1025, 1027, 1035, 1037, 1045, 1047, 1055, 1057. For the purpose of illustrating the principles of the present invention, it may be assumed that one-half of the RAUs 1005, 1025, 1035, 1045, 1055 are dedicated to the traffic on a first roadway 1080 of the two roadways 1080, 1090 and the other half of the RAUs 1007, 1027, 1037, 1047, 1057 are dedicated to the traffic on the other roadway 1090 of the two roadways 1080, 1090.

For each fiber optic ring, the traffic on each side of the ring is handled separately. In each direction (that is, for each of roadways 1080 and 1090), an available frequency bandwidth is divided into downlink frequencies $F_{1d}, F_{2d} \ldots F_{nd}$ and uplink frequencies $F_{1u}, F_{2u} \ldots F_{nu}$ using Frequency Division Duplex (FDD). With a combination of FDD and Time Division Multiple Access (TDMA) or Code Division Multiple Access (CDMA), each downlink or uplink frequency can support multiple user channels.

With TDMA, multiple fast moving users may use different time slots on a shared frequency band, and each fast moving user is assigned a channel comprising a specific time slot in the frequency band during which the user can communicate with a control station. Similarly, with CDMA, multiple fast moving users may use a same time and a same frequency band and each fast moving user is assigned a channel comprising a unique spreading code for communications with the control station. When a fast moving user enters a path segment, the user is assigned a channel comprising a frequency band and a time slot (TDMA) or a unique spreading code (CDMA). This channel assignment is unique within the segment regardless of which RAU is being used to communicate with the mobile unit of the fast moving user. This means that although the fast moving user exchanges uplink and downlink information with different RAUs while traversing the span of a given segment of the path, the user communicates with the same control station that controls the entire fiber optic ring via the same assigned channel regardless of the RAU serving the user.

While the fixed spectrum allocation limits the number of channels that can be used, the number of users continues to increase. Therefore, channels must be reused throughout a service area but users using the same channels should not interfere with each other. Since radio frequency signals attenuate with distance, channels can be reused if their reuse is spaced sufficiently far enough apart in distance. The traditional problem in mobile communication is the apparent conflict between the requirement for area coverage and user capacity. For a given number of channels in a frequency band, how big an area should be covered and how many users should be allowed is always an important consideration. Providing services to mobile units over a large area requires the base station to transmit at high power which prevents the channels from being reused for similar services for a considerable distance. In this case, the only way to increase the capacity is to use more frequency bands. Hence frequency reuse may be improved by restricting a transmit power of a base station transmitter, thereby permitting multiple uses of a frequency band in a same general area in one system.

The RoF network architecture according to the present invention may provide the benefit of a high rate of frequency reuse by employing small cells and low power antennas. In one example, the RAUs may be evenly spaced along either both sides of the center divide (FIG. 1) or both sides of the roadways (FIG. 2). Thus, for a given segment, RAUs 1005, 1025, 1035, 1045, 1055 serving the traffic on the roadway 1080 may belong to one cell and RAUs 1007, 1027, 1037, 1047, 1057 serving the traffic on the other roadway 1090 may belong to another cell and, in this example, use different frequency bands to avoid potential interference (for example, RAUs 1005, 1025, 1035, 1045, and 1055 may use frequency band B and RAUs 1007, 1027, 1037, 1047, 1057 may use frequency band A). In a similar fashion, a RAU 1005 serving a particular segment and a RAU 1025 serving an immediately proximate neighbor segment are considered to belong to different cells and may use different frequency channels to avoid potential interference as well.

For example, the network depicted in FIG. 10 employs a frequency reuse factor of 4. Consequently, RAUs on a same side of alternating segments, such as RAUs 1007, 1037, and 1057 on roadway 1090 side of alternating segments/fiber optic rings 1010, 1030, and 1050, may use a same frequency band, and none of the RAUs on either side of a neighboring fiber optic ring may use a same channel as is used in these rings. For example, as depicted in FIG. 10, the RAUs 1007, 1037, and 1057 of rings 1010, 1030, and 1050 that reside along roadway 1090 use a frequency band A, the RAUs 1005, 1035, and 1055 on the opposite side of rings 1010, 1030, and 1050 from RAUs 1007, 1037, and 1057, that is along roadway 1080, use a frequency band B, and the RAUs of neighboring rings 1020 and 1040 use frequency bands C and D. For example, the RAUs 1027 and 1047 along roadway 1090 may use the frequency band C, and the RAUs 1025 and 1045 along roadway 1080 may use the frequency band D.

Figure 11:
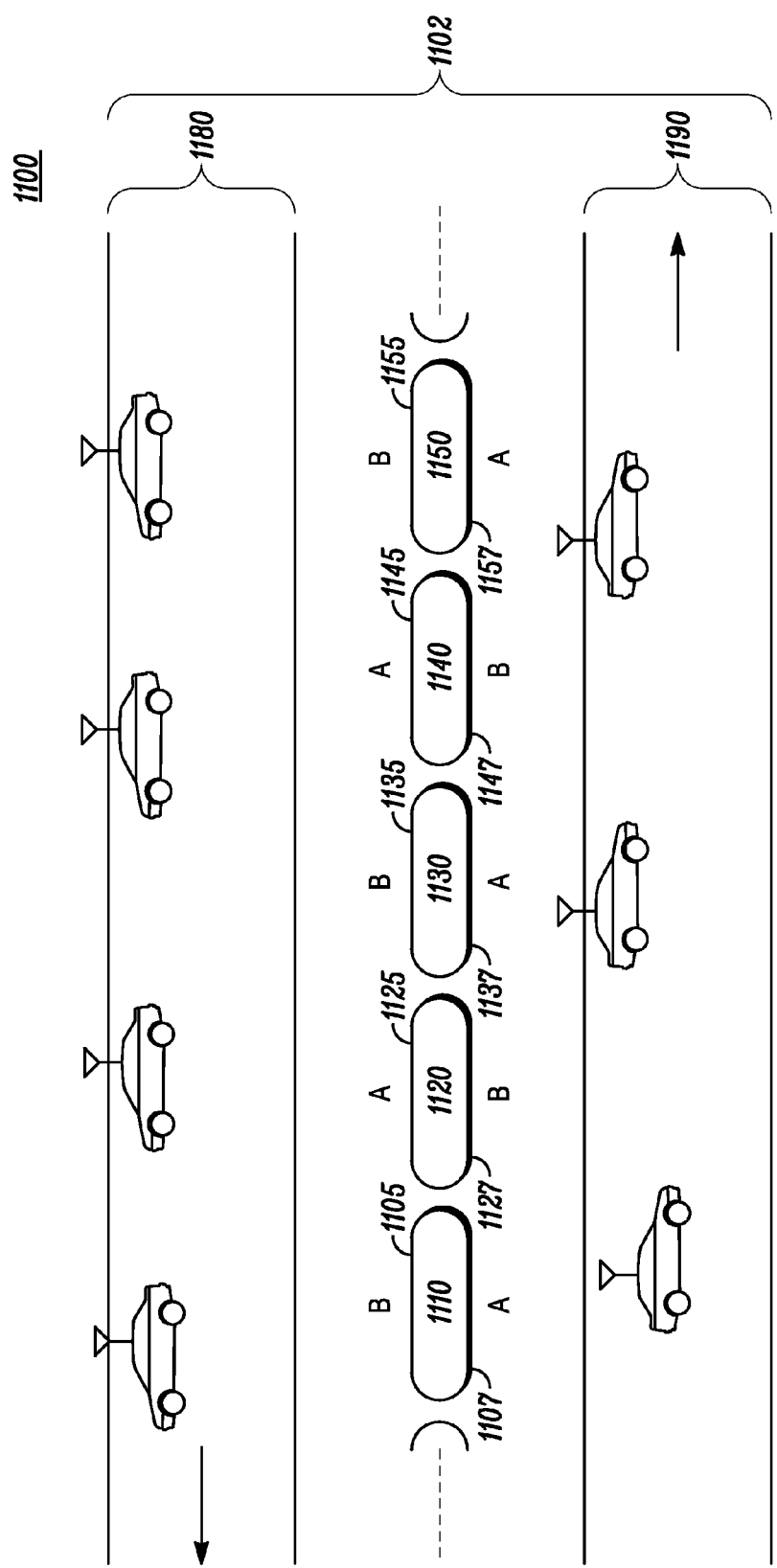
FIG. 11 is a graphical representation of a frequency reuse pattern in accordance with another embodiment of the present invention.

FIG. 11 is a graphical representation of a frequency reuse pattern in accordance with another embodiment of the present invention. Similar to the RoF network 1000 of FIG. 10, RoF network 1100 of FIG. 11 also includes a path 1102 that includes two roadways 1180 and 1190 for vehicular traffic moving in two opposite directions. The path is divided into multiple segments, and one fiber optic ring 1110, 1120, 1130, 1140, 1150 is constructed on each segment of the path 1102. Each fiber optic ring 1110, 1120, 1130, 1140, 1150 includes multiple RAUs 1105, 1107, 1125, 1127, 1135, 1137, 1145, 1147, 1155, 1157. As depicted in FIG. 11, one-half of the RAUs, that is, RAUs 1105, 1125, 1135, 1145, and 1155, are dedicated to the traffic on a first roadway 1180 of the two roadways and the other half of the RAUs, that is, RAUs 1107, 1127, 1137, 1147, and 1157, are dedicated to the traffic on the other roadway 11190.

In the embodiment depicted in FIG. 11, the RoF network 1100 employs a frequency reuse factor of 2. Consequently, the RAUs on alternating sides of neighboring segments may use the same frequency band. For example, as depicted in FIG. 11, RAU 1107 of ring 1110 and along roadway 1190, RAU 1125 of ring 1120 and along roadway 1180, RAU 1137 of ring 1130 and along roadway 1190, RAU 1145 of ring 1140 and along roadway 1180, and RAU 1157 of ring 1150 and along roadway 1190 each uses frequency band A. Similarly, the RAUs on the opposite sides of these rings, that is, RAU 1105 of ring 1110 and along roadway 1180, RAU 1127 of ring 1120 and along roadway 1190, RAU 1135 of ring 1130 and along roadway 1180, RAU 1147 of ring 1140 and along roadway 1190, and RAU 1155 of ring 1150 and along roadway 1180 each uses frequency band B.

Referring now to FIG. 12, a flowchart 1200 is provided that depicts a method for providing rapid handoff to fast moving users from a first RAU to a second RAU in accordance with an embodiment of the present invention.

One of the most important tasks a control station needs to perform is to hand off a fast moving user from one RAU to another when the user moves out the coverage area of a RAU. First of all, geographic position information for each RAUs within a RoF network is measured and stored in a central location, such as the MTSO. The position information may include an exact position of each RAU and may further include geographic information defining a coverage area of each RAU.

When a fast moving user first enters a coverage area of a RoF network, for example, is handed off to a coverage area of the RoF network or powers up his/her mobile unit while traveling in such a service area, the mobile unit registers with the network via a serving base station and RAU. Registration is the process by which the fast moving user notifies the control station of its location, status, identification, station class, and other characteristics. After the registration procedure is completed, the network conveys to the fast moving user, and the user receives 1210 from the MTSO, via the serving control station/base station and RAU, the pre-stored RAU position information and stores, in a memory of the mobile unit, the RAU position information.

After receiving the position information, the fast moving user determines 1220 a set of parameters for itself. The set of parameters includes a current speed of the fast moving user, a location of the user, and a direction of motion of the user. In one example, the set of parameters may be determined using a Global Positioning System (GPS) adapted to the fast moving user. In another example, any navigation system adapted to the fast moving user may be used for determining the set of parameters.

The fast moving user further compares 1230 the received position information and the determined set of parameters to determine whether a handoff is required. If a hand-off is found required, the fast moving user initiates and completes the hand-off from the first, currently serving RAU to a second, target RAU.

Figure 13:
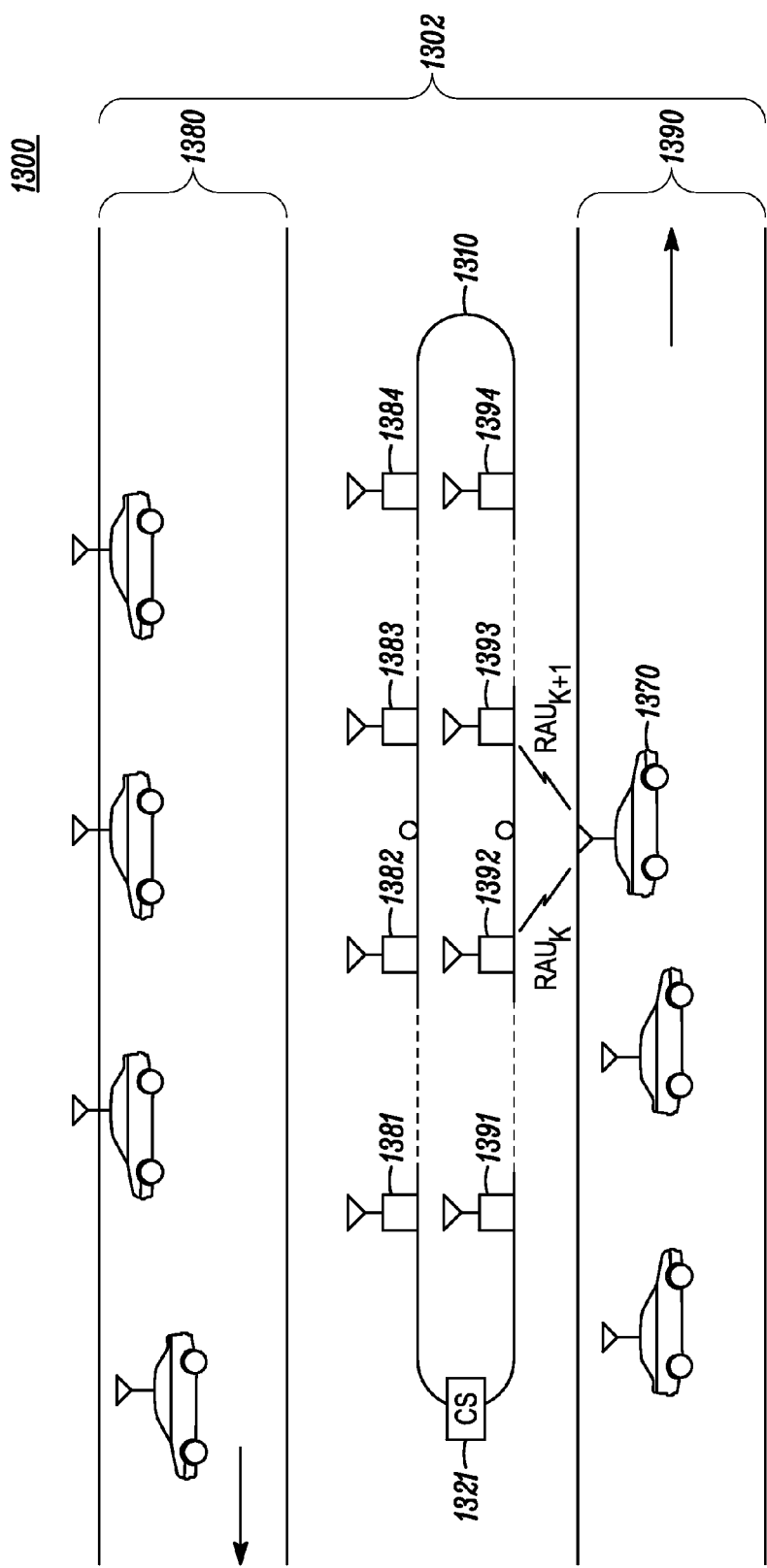
FIG. 13 is a block diagram of an intra-ring handoff in accordance with an embodiment of the present invention.

In one embodiment of the present invention, the first RAU and the second RAU may belong to a same fiber optic ring. Referring now to FIG. 13, a block diagram is provided that illustrates an intra-ring handoff by an RoF network 1300 in accordance with such embodiment. FIG. 13 includes a path 1302 that includes two roadways 1380 and 1390 for the traffic moving in two opposite directions. The path is divided into multiple segments and a fiber optic ring, such as fiber optic ring 1310, is constructed on each segment of the path.

The fiber optic ring 1310 includes multiple remote antenna units (RAUs) 1381-1384, 1391-1394. One-half of the multiple RAUs, that is, RAUs 1381-1384, are placed on one side of a center divide of the path and are dedicated to the traffic on a first roadway 1380 of the two roadways and the other half of the multiple RAUs, that is, RAUs 1391-1394, are placed on the other side of the center divide of the path and are dedicated to the traffic on a second roadway 1390 of the two roadways As each RAU on a given side of the center divide is part of a same ring, each such RAU operates in a same frequency band.

In FIG. 13, when a fast moving user 1370 first enters the service area covered by a RoF network 1300, a registration process takes place. After the registration procedure is completed, the fast moving user 1370 receives the position information from an MTSO (not shown) through a control station 1321 associated with fiber optic ring 1310. The fast moving user 1370 keeps receiving updated position information. The frequency at which the fast moving user 1370 receives updates is programmable but a minimum frequency should be maintained to ensure the proper handing of the handoff.

Now suppose that the fast moving user 1370 is currently traveling along roadway 1390 and is within the coverage range of RAU 1392. The fast moving user determines a set of parameters for itself. The set of parameters includes a current speed of the fast moving user, a location of the fast moving user, and a direction of motion of the fast moving user.

The fast moving user compares the position information and the determined set of parameters. In one example, the fast moving user 1370 first determines the distance between its location and a next RAU location, that is, RAU 1393, within the same ring, that is, ring 1310. Then using the current speed, the fast moving user 1370 calculates a time, $t_{next-antenna}$, that it will take for the fast moving user to enter a coverage area of the next RAU 1393. Then the fast moving user 1370 determines if $t_{next-antenna} \leq T_{intra-ring}$, where $T_{intra-ring}$ is a pre-defined threshold for initiating an intra-ring handoff. If $t_{next-antenna} \leq T_{intra-ring}$, then the fast moving user 1370 initiates the handoff to target RAU 1393, synchronizes with the target RAU, and completes the handoff within $T_{intra-ring}$ seconds.

Figure 14:
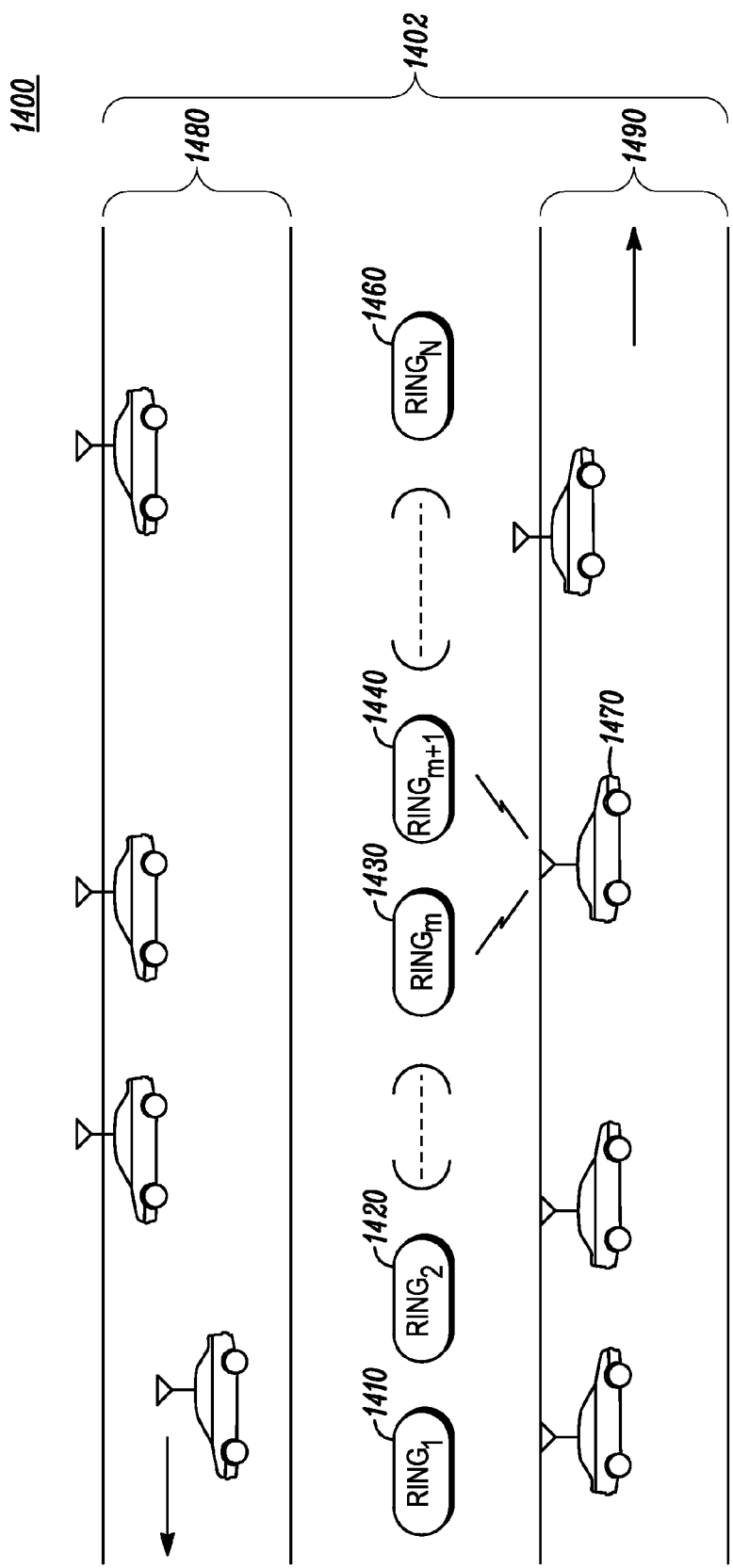
FIG. 14 is a block diagram of an inter-ring handoff in accordance with an embodiment of the present invention.

In another embodiment of the present invention, the first RAU and the second RAU may belong to different fiber optic rings. Referring now to FIG. 14, a block diagram is provided that illustrates an inter-ring handoff by a RoF network 1400 in accordance with such an embodiment. FIG. 14 includes a path 1402 that includes two roadways 1480 and 1490 for the vehicular traffic moving in two opposite directions. The path is divided into multiple segments and each segment of the multiple segments includes a fiber optic ring $RING_1$ 1410, $RING_2$ 1420, $RING_m$ 1430, $RING_{m+1}$ 1440, $RING_n$ 1460 (four rings, and correspondingly four segments, are shown). The frequency channels are different for each fiber optic ring $RING_1$ 1410, $RING_2$ 1420, $RING_m$ 1430, $RING_{m+1}$ 1440, $RING_n$ 1460. $RING_1$ 1410 is an entrance to the RoF network 1400 for the traffic on the roadway 1480. Similarly, RINGn 1460 is the entrance to the RoF network 1400 for the traffic on the roadway 1490.

In the embodiment depicted in FIG. 14, when a fast moving user 1470 first enters the service area covered by a RoF network 1400, a registration process takes place. After the registration procedure is completed, the network 1400 conveys to the fast moving user 1470, and the fast moving user receives from an MTSO (not shown) via a control station of a ring serving the user, the RAU position information sent. The fast moving user 1470 keeps receiving updated position information. The frequency at which the fast moving user 1470 receives updates is programmable but a minimum frequency should be maintained to ensure the proper handing of the handoff.

As depicted in FIG. 14, the fast moving user 1470 is currently within the coverage range of $RING_m$ 1430 and communicates with the control station of $RING_m$ 1430. The fast moving user determines a set of parameters for itself. The set of parameters includes a current speed of the fast moving user, a location, and a direction of motion of the fast moving user.

The fast moving user compares the position information and the determined set of parameters. In one example, the fast moving user 1470 first determines a distance between its current location and the location of the very last RAU of the ring $RING_m$ 1430 to determine whether the next handoff will be an inter-ring handoff. If the fast moving user 1470 determines that the hand-off is an inter-ring handoff, then the procedure explained below is followed. Otherwise, the fast moving user follows the procedure for intra-ring handoff explained with respect to FIG. 13.

If the hand-off is an inter-ring handoff, then using the current speed, the fast moving user 1470 calculates a time, $t_{next-ring}$, that it will take for the fast moving user to enter the coverage area of $RING_{m+1}$. Then the fast moving user 1470 determines if the $t_{next-ring} \leq T_{inter-ring}$, where $T_{inter-ring}$ is a pre-defined threshold for initiating an inter-ring handoff. If the $t_{next-antenna} \leq T_{intra-ring}$, then the fast moving user 1470 initiates a handoff with a control station of the next $RING_{m+1}$ 1440 to synchronize with the new control station and completes the handoff within $T_{inter-ring}$ second.

Evidently, the rapid inter-ring handoff is made possible by fully exploiting the one-dimensional nature of the path (highway or railway) and the fact that traffic only moves in one direction on each side of the path 1402.

Therefore, the aforementioned method and architecture helps to provide better coverage, increased capacity, rapid hand-offs, dynamical allocation of bandwidth resources, less interference, and most importantly, high bandwidth broadband communications to fast moving users.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless communication network architecture, for providing high-bandwidth broadband communication to a plurality of fast moving users, the wireless communication network architecture comprising:
   a plurality of segments formed by dividing a path of travel of the fast moving users;
   a plurality of fiber optic rings, wherein each fiber optic ring of the plurality of fiber optic rings is constructed on a segment of the plurality of segments using an optical fiber;
   a plurality of remote antenna units (RAUs), wherein each RAU of the plurality of RAUs is integrated into an Add/Drop Multiplexer (ADM) and wherein each ADM is connected to a fiber optic ring of the plurality of fiber optic rings; and
   a plurality of base stations, wherein each base station of the plurality of base stations is connected to a RAU of the plurality of RAUs.

2. The wireless communication network architecture of claim 1, wherein the plurality of base stations are located in a common location to form a control station.

3. The wireless communication network architecture of claim 2, wherein the control station is integrated into another Add/Drop Multiplexer (ADM).

4. The method of claim 3, wherein the another ADM is connected to a Mobile Telephone Switching Office (MTSO).

5. The wireless communication network architecture of claim 1, wherein half RAUs of the plurality of RAUs are placed on one side of a center divide of the path and other half RAUs of the plurality of RAUs are placed on other side of the center divide of the path.

6. The wireless communication network architecture of claim 1, wherein each RAU of the plurality of RAUs is equidistant from each other.

7. A method for dynamically reconfiguring bandwidth resources in a Radio over Fiber (RoF) network of fast moving users, the method comprising:
   dividing a path of travel of the fast moving users into a plurality of segments;
   constructing a plurality of fiber optic rings, wherein each of the plurality of fiber optic rings is constructed on a segment of the plurality of segments using an optical fiber;
   placing a plurality of remote antenna units (RAUs) on each fiber optic ring of the plurality of fiber optic rings, wherein each RAU of the plurality of RAUs is integrated into an Add/Drop Multiplexer (ADM); and
   connecting the plurality of RAUs to a plurality of base stations.

8. The method of claim 7, wherein the Add/Drop Multiplexer is a Reconfigurable Optical Add/Drop Multiplexer (ROADM).

9. The method of claim 7 further comprising:
   placing the plurality of base stations in a common location to form a control station.

10. The method of claim 7, wherein the RoF network employs a Dense Wave Division Multiplexing (DWDM) optical transport.

11. The method of claim 7 further comprising:
    increasing bandwidth resources at a first plurality of RAUs from the plurality of RAUs, if more bandwidth resources are required at the first plurality of RAUs, as compared to currently allocated bandwidth resources of the first plurality of RAUs.

12. The method of claim 7 further comprising:
    decreasing bandwidth resources at a second plurality of RAUs from the plurality of RAUs, if less bandwidth resources are required at the second plurality of RAUs, as compared to currently allocated bandwidth resources of the second plurality of RAUs.

13. The method of claim 7, further comprising:
    determining a distance between each RAU of the plurality of RAUs, wherein the distance is based at least on a frequency band, a wireless communication system capacity, a channel bandwidth, or a remote antenna unit power.

* * * * *